United States Patent [19]
Schmidt

[11] 4,029,841
[45] June 14, 1977

[54] INJECTION MOLDING PROCESS

[75] Inventor: Lawrence R. Schmidt, Schenectady, N.Y.

[73] Assignee: General Electric Company, Schenectady, N.Y.

[22] Filed: Feb. 14, 1975

[21] Appl. No.: 550,003

[52] U.S. Cl. .............................. 428/325; 428/441; 264/245; 264/328; 264/329

[51] Int. Cl.$^2$ ......................................... B29F 1/12

[58] Field of Search ................. 264/245, 328, 329; 428/325; 425/441

[56] References Cited

UNITED STATES PATENTS

| | | | |
|---|---|---|---|
| 2,269,953 | 1/1942 | Morin | 264/245 X |
| 3,221,373 | 12/1965 | Kwan | 264/245 X |
| 3,716,612 | 2/1973 | Schrenk | 264/329 X |
| 3,751,534 | 8/1973 | Oxley | 264/328 X |
| 3,801,684 | 4/1974 | Schrewe | 264/328 X |

Primary Examiner—Richard R. Kucia
Attorney, Agent, or Firm—F. Wesley Turner; Joseph T. Cohen; Jerome C. Squillaro

[57] ABSTRACT

A process for molding an article having preselected portions formed of different organic plastic materials is described which comprises (a) positioning at least a first skin material essentially free of reinforcing fillers and at least a first core material containing reinforcing fillers in an elongated heating zone at preselected locations of the materials relative one to the other; (b) heating the materials to a temperature sufficient to melt each of the materials while maintaining said materials at their preselected relative positions; (c) exerting a force against an end of the melted materials; (d) linearly moving the melted material in response to the force through the heating zone and into a mold cavity; and (e) cooling at least the first skin and first core materials in the mold cavity. The process can be employed advantageously to provide substantially distortion free injection molded products having glass fiber filled large thin walled sections.

10 Claims, 4 Drawing Figures

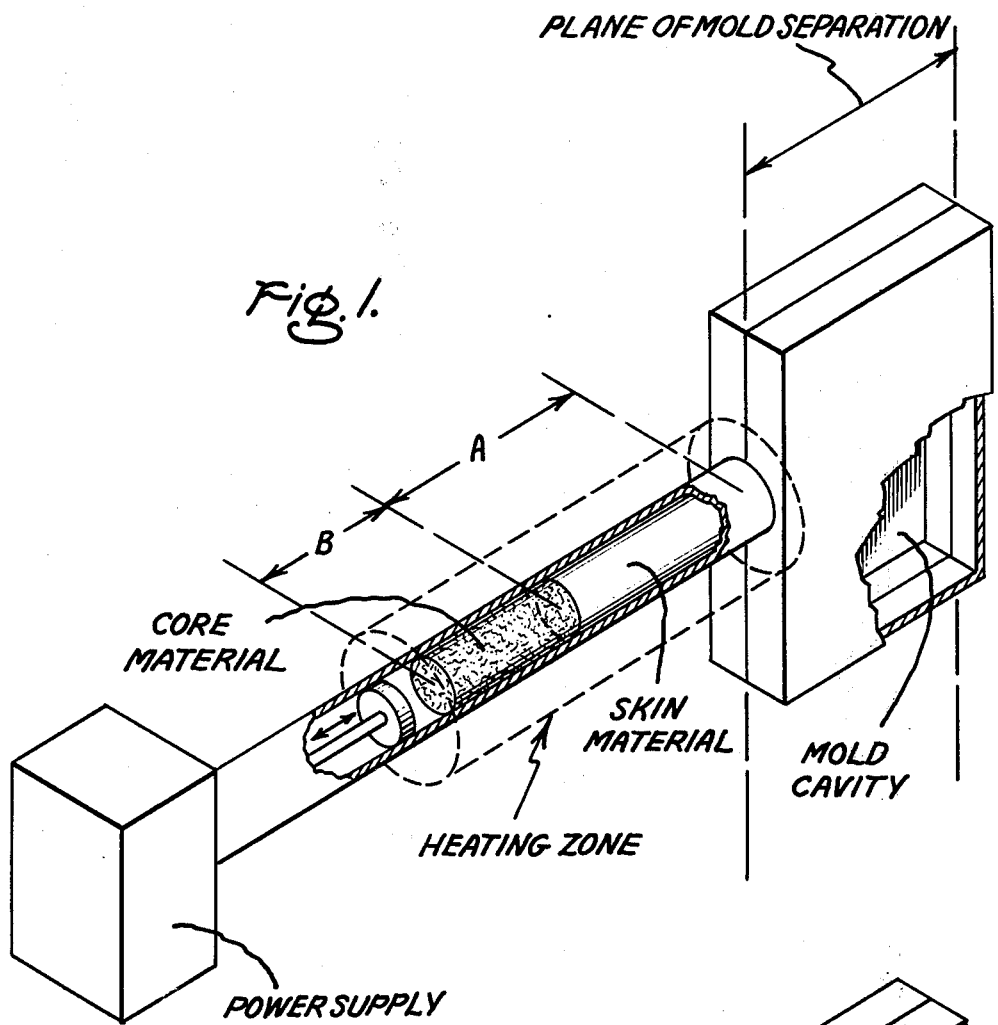
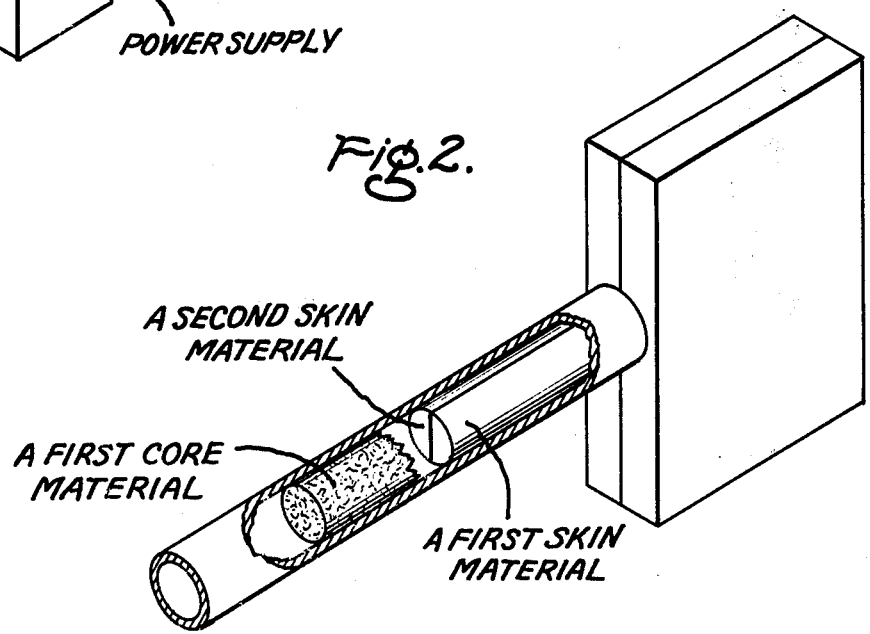

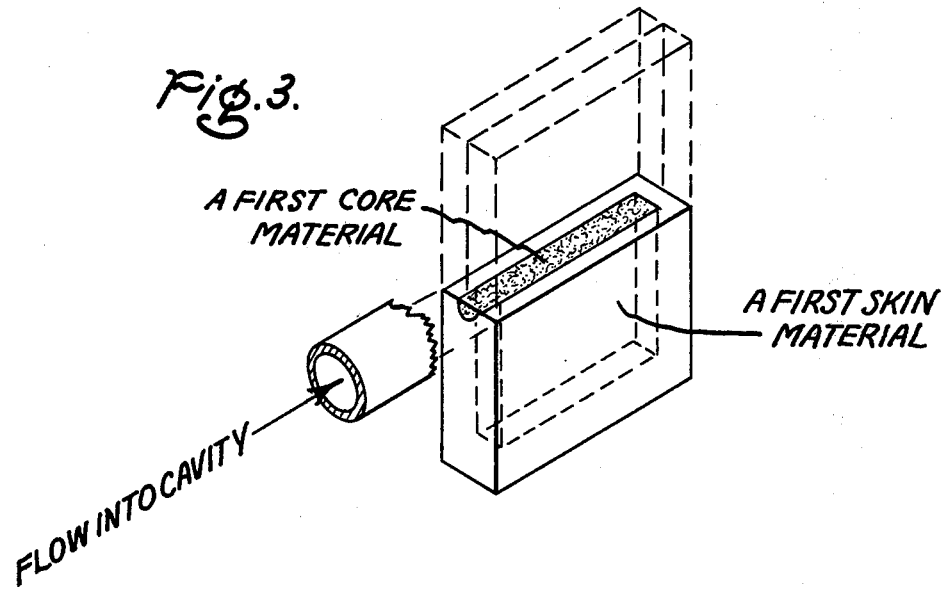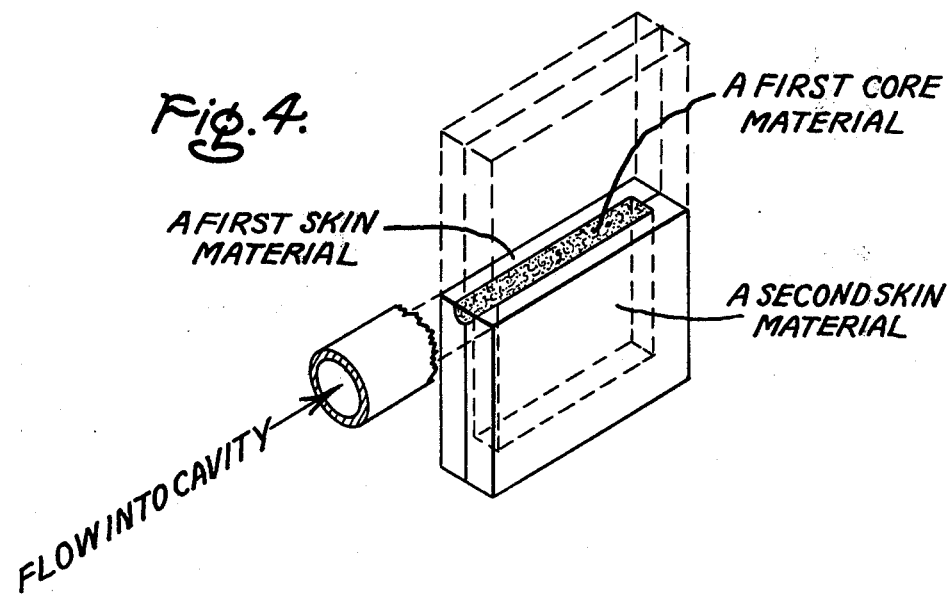

INJECTION MOLDING PROCESS

This invention relates to a process for molding an article having preselected portions formed of different organic plastic materials which method comprises (a) positioning at least a first skin material essentially free of reinforcing fillers and at least a first core material containing reinforcing fillers in an elongated heating zone at preselected locations of the materials relative one to the other; (b) heating the materials to a temperature sufficient to melt each of the materials while maintaining said materials at their preselected relative positions; (c) exerting a force against an end of the melted materials; (d) linearly moving the melted material in response to the force through the heating zone and into a mold cavity; and (e) cooling at least the first skin and first core materials in the mold cavity.

Injection molding techniques for the fabrication of various complex polymer systems which sequentially inject different polymer melts into a mold cavity to yield skin core two-phase molded parts — frequently referred to as sandwich molding processes — are currently the subject of investigation by those skilled in the art. These investigations have furnished the observations of Garner and Oxley, Great Britain Pat. No. 1,156,217, published June 25, 1969, which describes a process for the preparation of molded parts having a foamed core and a unfoamed surface skin, the observations of J. L. White and H. B. Dee, published by the Polymer Engineering and Science, March 1974, Vol. 14, No. 3, which describes sequential injection of different polymer melts having different viscosities into the same mold cavity in the study of the melt flow within injection molds during injection molding of two rheologically characterized polymer melts, as well as the observations among others of R. L. Ballman, R. L. Kruse and W. F. Taggart, Polym. Eng. Sci., 10, 154 (1970); L. D. Cochran and G. W. Osborn, SPE J., 25, 20 (September 1969); D. F. Oxley and D. J. H. Sandiford, Plastics and Polymers, 39, 288 (1971).

Unexpectedly, I have found that a solid skin and a solid core two-phase molded part having a nonreinforced skin component and a reinforced core component can be prepared by my process. Further, I have found that my process provides thin-walled sandwich molded article of manufacture which has high impact strength, high heat distortion, high tensile strength, etc., and which — as a result of the summation of the internal stresses in the resulting molded product — are substantially free from distortion, i.e. warpage.

Essentially, my invention comprises a process for molding an article having preselected portions formed of different organic plastic materials, comprising (a) positioning at least a first skin material essentially free of reinforcing fillers and at least a first core material containing reinforcing fillers in an elongated heating zone at preselected locations of materials relative to the other; (b) heating the materials to a temperature sufficient to melt each of the materials while maintaining said materials at their preselected relative positions; (c) exerting a force against an end of the melted materials; (d) linearly moving the melted material in response to the force through the heating zone and into a mold cavity; and (e) cooling the at least first skin and first core materials in the mold cavity.

The process of this invention is further illustrated by reference to FIG. 1 showing an injection molding apparatus having a power supply, means for forcing organic plastic materials in a melt form into a mold cavity, a heating zone, a first nonreinforced skin material and a first reinforced core material positioned in preselected locations in the heating zone as well as a partial cutaway section showing the interior cavity of the injection machine mold.

FIG. 2 is a drawing showing a portion of the injection molding apparatus of FIG. 1 which illustrates a side-by-side first position of two different nonreinforced materials which form the skin of an asymmetrically molded article and a partial section of a second position reinforced material which forms the core of the molded article.

FIG. 3 is a drawing showing a portion of a molded article as formed in a mold cavity having a skin of one material and a core of another material.

FIG. 4 is a drawing showing a portion of a molded article formed in a mold cavity having an asymmetrically formed skin made up of two — a first and a second — skin materials and a core of another material.

Employing FIG. 1, a process embodiment of this invention comprises positioning a nonreinforced thermoplastic skin material in the first linear portion A of the elongated heating zone adjacent the mold of the injection machine and positioning a reinforced thermoplastic core material in the second linear portion B of the elongated heating zone adjacent the skin material located in the linear portion A of the elongated heating zone. The skin material and core material, occupying the first position A and second position B of the heating zone respectively, are heated to the polymer melt temperature, i.e. the temperature where the polymers softens and flows — regardless of morphologic character of the polymer, e.g. crystalline, amorphous, etc. The polymeric materials in melt form are forced from the heating zone into the mold cavity to form a molded article, shown in FIG. 3, having nonreinforced skin material and a reinforced core material.

Another process embodiment of this invention, illustrated by means of FIG. 2, comprises positioning two nonreinforced thermoplastic skin materials in a side-by-side relationship to each other, each extending along the linear length of the first linear portion A of the elongated heating zone adjacent the mold of the injection machine, and positioning a reinforced thermoplastic core material in the second linear portion B of the elongated heating zone adjacent the skin materials located in the linear portion A of the elongated heating zone. The skin and core materials are heated to the melt temperature of the polymeric material(s) employed and forced under pressure into the mold cavity to form asymmetrically a molded article, shown in FIG. 4.

Although not illustrated by the Figures, asymmetrically molded articles having different skin materials free of any core material can be injection molded providing the process is carried out as described hereinbefore except that both heating positions A and B contain only skin materials positioned in a side-by-side position relative to each other.

The amount of nonreinforced thermoplastic skin material which is injected into the mold will depend upon the size and configuration of the mold. It can be any amount which is sufficient to completely cover the surface of the mold cavity. The amount of reinforced thermoplastic core material can be any amount which is sufficient to fill the remaining portion of the mold cavity whereby a solid article is formed having an outer surface formed of nonreinforced material and a core formed of a reinforced material. Further, either or both the non- or reinforced materials can consist of different materials which can be positioned at preselected locations in the first or second positions A or B, respectively in a side-by-side position and orientated relative to any plane, e.g. the plane of mold separation, of the mold cavity.

In general, any organic plastic material, e.g. a thermoplastic polymer or mixtures thereof, can be employed. Representative materials include polyphenylene oxide, polystyrene, polyethylene terephthalate, polybutylene terephthalate, polyethylene, polypropylene, polycarbonate, polyether, polyamideimide, polyetherimide, polyvinylchloride, polyvinylidene chloride, etc., as well as copolymers and polymer blends thereof.

Any polymer can be employed either in the absence of or in the presence of fillers subject to the proviso that the skin material must be free of any reinforcing fillers, i.e. fillers which are well-known to those skilled in the art as not adding strength, stiffness, or impact strength to a composition containing the polymer, and further subject to the proviso that the core materials must contain a reinforcing amount of a reinforcing filler, i.e. fillers which are known to add strength, stiffness and impact strength to a composition containing the polymer. Illustrative of a reinforcing filler are materials such as fibers, whiskers or platelets of metal, e.g. aluminum, iron or nickel, and the like, and nonmetals, e.g. ceramics, carbon filaments, silicates, asbestos, titanium dioxide, titanate whiskers, quartz or glass flakes and fibers, and the like. In a preferred embodiment, the core materials are reinforced primarily by fillers of glass, more preferably fibrous glass filaments. The non-fibrous or nonreinforcing fillers that can be used comprise any of the well-known fillers which comprise talcs, glass beads, pigments, stabilizers, etc.

It is essential that reinforcing fillers not be contained in the skin of the molded article since the inclusion therein of any reinforcing amount of a reinforcing filler will cause the article to exhibit significant warpage after removal of the article from the mold.

In the practice of this invention, any injection molding apparatus can be employed which permits a thermoplastic material to be injected into a mold cavity subject to the proviso that the equipment employed force the thermoplastic melt into the mold cavity in response to a force transmitted to the polymer melt by a nonrotating plunger contained within the barrel of an injection molding machine as opposed and in contradistinction to the force transmitted to a polymer melt as a result of the rotation and thrust of the screw in the barrel of an injection molding apparatus. It is essential that the nonreinforced thermoplastic portion and the reinforced thermoplastic portion of the polymer melts, i.e. first and second polymer melt zones A and B illustrated in FIG. 1, are not subjected to a complex shear field which would — due to high shear forces within their polymer melts — tend to mechanically shear the reinforcing agent located in the core melt material or would tend to destroy the interface between the skin material and the core material as the polymer melt is forced into the mold cavity of the injection molding machine. The purpose of avoiding such mixing action is to minimize fiber attrition and to ensure that the skin material substantially uniformly enters the mold cavity and completely covers the surface of the mold cavity, except for a very small cross sectional area located at the gate of the mold cavity where the core material forms a portion of the surface area of the injection molded article. If it is essential that only the skin material conform to the cavity of the injection mold — even the gate area wherein the polymer melts are introduced into the cavity mold — the final or last portion of the heating zone B can be filled with nonreinforced material comparable to the skin material located in the first position of the heating zone A.

This invention is particularly useful in the injection molding of articles of manufacture which have relatively large surface areas in comparison to the thickness of their walls. In general, the invention is especially suited to the injection molding of thin sheets of nonporous, e.g. solid, plastic articles having a thickness of from about 25 to about 250 mils, more particularly to sheets having a thickness of from about 50 to about 125 mils, and having a skin thickness of from about 1 to about 25 mils, or even more. The articles of manufacture which can be prepared by the process of this invention comprise injection molded polymeric plastic materials which are essentially free of warpage or distortion. These articles can be used in a wide variety of shapes and forms, e.g. sheets, panels, containers, etc., which are commonly employed in the manufacture of washing machines, refrigerators, television sets, radios, motor vehicles, airplanes, trains, boats, etc.

In order that those skilled in the art will be better able to practice the invention, the following example is given by way of illustration and not by way of limitation. All parts are by weight.

EXAMPLE I

A mold cavity 2½ × 2½ × 1/16 inch was fitted to an injection molding machine. The first heating zone of the machine, comparable to heating zone A shown in FIG. 1, was charged with Amoco No. 20-9605 Impact-Modified Polypropylene (2.5% ethylene, narrow molecular weight distribution, melt flow ASTM D1238 = 5 gm./10 min.) containing small glass beads having average diameter ranging from 20 to 50 microns. The nonreinforced polypropylene contained about 1% by weight titanium dioxide for purposes of pigmentation. The second heating zone, comparable to heating zone B shown in FIG. 1, was charged with the same thermoplastic material, polypropylene, however — instead of glass beads, contained 15% by weight chopped Owens-Corning glass fibers (Fiberglass, K filament, E glass) having an average length of less than ⅛ inch and an average diameter of about 0.0005 inch. The heating zone of the injection machine was heated to a temperature range of from about 230° to 240° C. The melt compositions of heating zones A and B were injected into the mold cavity having a temperature of about 110° C. The mold was allowed to cool to about 50° C., and a molded article substantially free of any distortion or warpage was removed from the mold. The skin of the article(s) consisted of the nonreinforced material except for a small portion of core material adjacent the gate location of the injection mold cavity and the core of the article consisted of the reinforced material.

EXAMPLE II

An asymmetrically molded article 2½ × 2½ × ⅛ inch was molded in accordance with the general procedure set out in Example I with the exception that (1) no reinforced core material and (2) two unreinforced side-by-side skin materials which extended along the entire linear length of the A and B positions of the heating zone were employed. The first and second skin materials were asymmetrically orientated in the heating zone with their plane of separation corresponding with plane of mold separation. One of the side-by-side position materials was pigmented black and the other in white. Both side-by-side materials were the thermoplastic polyester Valox 310, a commercial product of the General Electric Company having an intrinsic viscosity of approximately 0.8 dl. gram in hexafluoroisopropanol, $M_n \simeq 16,000$, $P_n \simeq 73$ units. A molded article was recovered substantially free of any distortion or warpage having black and white pigmented surface sections asymmetrically aligned with a plane of the mold separation.

EXAMPLE III

An asymmetrically molded article was prepared in accordance with the procedure set out in Example II except that the polymer employed — rather than being a thermoplastic polyester resin like that employed in Example II — was the thermoplastic polypropylene resin type Amoco No. 20-9605 like that employed in Example I. The entire heating zone positions A and B contained in a side-by-side relationship a first nonreinforced polypropylene skin material filled with glass beads and a second reinforced polypropylene skin material filled with the type of chopped fiberglass described in Example I.

The polymer melt was injectd into the mold cavity in accordance with the general procedure set out in Example I and a molded article was formed which had substantial distortion after removal of the mold.

Although the above examples are limited to only a very few of the many types of thermoplastic materials which can be employed in the practice of the invention, it should be understood that the present invention is directed to the use of any unreinforced thermoplastic polymer material as a skin material and any reinforced thermoplastic material as a core material employed in any injection molding machine in accordance with the inventive concepts set out herein.

What I claim as new and desire to secure by Letters Patent in the United States is:

1. A process for molding a solid thermoplastic article substantially free of warpage having a skin material essentially free of a nonreinforcing filler and a core material containing a reinforcing filler comprising:
    a. positioning at least a first skin material free of a reinforcing amount of a reinforcing filler and at least a first core material containing a reinforcing amount of a reinforcing filler in an elongated heating zone at preselected locations of said materials relative one to the other;
    b. heating said materials to a temperature sufficient to melt each of said materials while maintaining said materials at their preselected relative positions;
    c. exerting a force free of complex shear fields against an end of the melted materials;
    d. linearly moving the melted materials in response to said force through the heating zone and into a mold cavity; and
    e. cooling said first skin and said first core materials in the mold cavity.

2. The process of claim 1, wherein the at least a first skin material is of a size sufficient to substantially fill a first linear portion of the elongated heating zone adjacent the mold and the at least first core material is positioned in a second linear portion of the elongated heating zone.

3. The process of claim 2, wherein the skin material is of a size sufficient to completely cover the surface of the mold cavity and the core material is of a size sufficient to fill the remaining portion of the mold cavity for forming an article having an outer surface formed of a skin material and a core formed of another material.

4. The process of claim 3, including positioning at least first and second skin materials free of reinforcing amounts of reinforcing fillers in a side-by-side relationship, each extending along the linear length of a first linear portion of the heating zone for orienting the longitudinal plane of the interface between the skin materials relative to the mold.

5. The process of claim 4, including positioning at least first and second core materials containing a reinforcing amount of a reinforcing filler in a side-by-side relationship, each extending along the linear length of a second linear portion of the heating zone for orienting the longitudinal plane of the interface between the core materials relative to the mold.

6. The process of claim 3, including positioning at least a first and a second core material in a side-by-side relationship, each extending along the linear length of a second linear portion of the heating zone.

7. The process of claim 3, wherein the skin and the core materials are each of a size sufficient to substantially fill about 50% of the mold cavity.

8. The process of claim 3, including positioning a skin material in a third linear portion of the elongated heating zone.

9. An article manufactured by the process of claim 1.

10. An article manufactured by the process of claim 4.

* * * * *